(12) United States Patent
Todd (10) Patent No.: US 11,870,847 B2
(45) Date of Patent: Jan. 9, 2024

(54) DECENTRALIZED DATA FLOW VALUATION AND DEPLOYMENT

(71) Applicant: EMC IP Holding Company LLC, Hopkinton, MA (US)

(72) Inventor: Stephen J. Todd, Center Conway, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/252,987

(22) Filed: Jan. 21, 2019

(65) Prior Publication Data

US 2020/0236168 A1 Jul. 23, 2020

(51) Int. Cl.
*H04L 67/1097* (2022.01)
*G06F 16/27* (2019.01)
*H04L 67/12* (2022.01)
*H04L 67/1074* (2022.01)

(52) U.S. Cl.
CPC .......... *H04L 67/1097* (2013.01); *G06F 16/27* (2019.01); *H04L 67/1074* (2013.01); *H04L 67/12* (2013.01)

(58) Field of Classification Search
CPC . H04L 67/1097; H04L 67/1074; H04L 67/12; G06F 16/27
See application file for complete search history.

(56) References Cited

U.S. PATENT DOCUMENTS

| | | | | |
|---|---|---|---|---|
| 8,455,844 | B2 * | 6/2013 | Lear .................. | G01J 3/4406 250/458.1 |
| 8,913,345 | B1 * | 12/2014 | Behrens ................ | G11B 5/02 360/110 |
| 9,734,195 | B1 * | 8/2017 | Pandit ................ | G06F 16/35 |
| 9,798,427 | B2 * | 10/2017 | Chang ................ | G06F 3/04166 |

(Continued)

FOREIGN PATENT DOCUMENTS

EP    3376731 B1 *  9/2018  ............. H04L 29/06

OTHER PUBLICATIONS

Satoshi Nakamoto, "Bitcoin: A Peer-to-Peer Electronic Cash System," http://bitcoin.org/bitcoin.pdf, 2008, 9 pages.

(Continued)

*Primary Examiner* — William G Trost, IV
*Assistant Examiner* — Abdelbasst Talioua
(74) *Attorney, Agent, or Firm* — Ryan, Mason & Lewis, LLP (57) ABSTRACT

Techniques are disclosed for decentralized data flow valuation and deployment in a highly distributed system. For example, a method comprises the following steps performed in a highly distributed system comprising a plurality of gateway nodes, wherein each of the plurality of gateway nodes is operatively coupled to one or more sensors that provide sensor data to the corresponding gateway node. A data flow is obtained at a given gateway node from a decentralized data storage system upon which a plurality of data flows is stored. The data flow is executed at the given gateway node, wherein the data flow is executed on sensor (Continued)

data obtained by the given gateway node from the corresponding one or more sensors. A data flow valuation operation is performed at the given gateway node based on the executed data flow to generate a data flow valuation result.

20 Claims, 8 Drawing Sheets

(56) References Cited

U.S. PATENT DOCUMENTS

| | | | |
|---|---|---|---|
| 10,750,351 B1* | 8/2020 | Paczkowski | H04L 12/4625 |
| 2008/0259316 A1* | 10/2008 | Ehrich | G07D 7/12 |
| | | | 356/71 |
| 2009/0005657 A1* | 1/2009 | Bodlaender | A61B 5/165 |
| | | | 600/301 |
| 2011/0295865 A1* | 12/2011 | Carroll | G06F 16/86 |
| | | | 707/756 |
| 2012/0239257 A1* | 9/2012 | Ichinose | G01C 7/04 |
| | | | 701/124 |
| 2012/0290266 A1* | 11/2012 | Jain | G16H 50/50 |
| | | | 702/187 |
| 2015/0003335 A1* | 1/2015 | Kakadia | H04L 43/08 |
| | | | 370/329 |
| 2015/0359069 A1* | 12/2015 | Tiberi | H05B 47/10 |
| | | | 315/151 |
| 2016/0147205 A1* | 5/2016 | Kaufman | G05B 19/4183 |
| | | | 700/44 |
| 2018/0061159 A1* | 3/2018 | Saso | G08B 13/19645 |
| 2018/0341664 A1* | 11/2018 | Jain | G06F 16/51 |
| 2019/0158594 A1* | 5/2019 | Shadmon | G06F 16/20 |
| 2019/0258986 A1* | 8/2019 | Nguyen | G06Q 20/401 |
| 2019/0334716 A1* | 10/2019 | Kocsis | G06N 3/045 |
| 2019/0384479 A1* | 12/2019 | Togashi | G06F 3/0418 |
| 2020/0043590 A1* | 2/2020 | Lee | G16H 40/60 |
| 2020/0117818 A1* | 4/2020 | Latka | G06F 12/1408 |
| 2020/0143300 A1* | 5/2020 | Weldemariam | G06F 16/1805 |
| 2021/0256070 A1* | 8/2021 | Tran | G06F 16/90332 |
| 2021/0356945 A1* | 11/2021 | Cella | H04L 67/125 |

OTHER PUBLICATIONS

Doug Laney, "The Economics of Information Assets," The Center for Infonomics, Smarter Companies presentation, Sep. 2011.
Dell, "Dell Boomi Flow—Build Customer Journeys with Low-Code Development," https://boomi.com/wp-content/uploads/Dell-Boomi-Flow-Datasheet.pdf, 2017, 2 pages.
Juan Benet, "IPFS—Content Addressed, Versioned, P2P File System (Draft 3)," http://arxiv.org/abs/1407.3561, Jul. 14, 2014, 11 pages.
U.S. Appl. No. 15/072,557 filed in the name of Stephen Todd et al. filed Mar. 17, 2016 and entitled "Metadata-Based Data Valuation."
U.S. Appl. No. 15/135,817 filed in the name of Stephen Todd et al. filed Apr. 22, 2016 and entitled "Data Value Structures."
U.S. Appl. No. 14/863,783 filed in the name of Stephen J. Todd et al. filed Sep. 24, 2015 and entitled "Unstructured Data Valuation."
U.S. Appl. No. 15/136,327 filed in the name of Stephen J. Todd et al. filed Apr. 22, 2016 and entitled "Calculating Data Value Via Data Protection Analytics."
U.S. Appl. No. 15/135,790 filed in the name of Stephen J. Todd et al. filed Apr. 22, 2016 and entitled "Data Valuation at Content Ingest."
U.S. Appl. No. 16/163,717 filed in the name of Stephen J. Todd filed Oct. 18, 2018 and entitled "Data Valuation and Sensor Data Management."

* cited by examiner

DECENTRALIZED DATA FLOW VALUATION AND DEPLOYMENT

FIELD

The field relates generally to networks of computing resources, and more particularly to techniques for data management in such networks of computing resources.

BACKGROUND

Enterprises or other entities typically have a large information technology (IT) infrastructure comprising a network of computing resources distributed across a geographic environment forming a highly distributed system. For example, in some scenarios, a highly distributed system includes gateways connecting Internet of Things (IoT) devices (e.g., sensors, tags, other monitoring or display systems, actuators, etc.) to edge servers. The edge servers then communicate with or are otherwise part of cloud platforms that host application programs (e.g., analytics or other applications) associated with an enterprise. The applications process or otherwise utilize the data received from the IoT devices and, in some cases, send data to the IoT devices to influence some action. Gateways can be mobile and can come in a variety of forms including, but not limited to, employee mobile devices, customer mobile devices, and vehicles (e.g., drones, planes, cars, trucks, other shipping transports, etc.). Gateways can also be stationary.

As data increasingly streams in from IoT sensors to gateways and into geographically dispersed edge servers, and in some cases is subject to analytics and/or other processing, the ability to effectively leverage the data becomes increasingly difficult.

SUMMARY

Embodiments of the invention provide techniques for decentralized data flow valuation and deployment in a highly distributed system. For example, in an illustrative embodiment, a method comprises the following steps performed in a highly distributed system comprising a plurality of gateway nodes, wherein each of the plurality of gateway nodes is operatively coupled to one or more sensors that provide sensor data to the corresponding gateway node. A data flow is obtained at a given gateway node from a decentralized data storage system upon which a plurality of data flows is stored. The data flow is executed at the given gateway node, wherein the data flow is executed on sensor data obtained by the given gateway node from the corresponding one or more sensors. A data flow valuation operation is performed at the given gateway device based on the executed data flow to generate a data flow valuation result.

These and other features and advantages of the invention will become more readily apparent from the accompanying drawings and the following detailed description.

DETAILED DESCRIPTION

Illustrative embodiments will be described herein with reference to exemplary information processing systems and associated host devices, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual computing resources. An information processing system may therefore comprise, for example, a cloud infrastructure hosting multiple tenants that share cloud computing resources. Such systems are considered examples of what are more generally referred to herein as cloud computing environments.

Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system.

On the other hand, cloud infrastructures that are used by multiple enterprises, and not necessarily controlled or managed by any of the multiple enterprises but rather are respectively controlled and managed by third-party cloud providers, are typically considered "public clouds." Thus, enterprises can choose to host their applications or services on private clouds, public clouds, and/or a combination of private and public clouds (hybrid clouds) with a vast array of computing resources attached to or otherwise a part of such IT infrastructure.

However, a given embodiment may more generally comprise any arrangement of one or more processing devices.

As used herein, the following terms and phrases have the following illustrative meanings:

"valuation" as utilized herein is intended to be broadly construed so as to encompass, for example, a computation and/or estimation of something's worth or value; in this case, data valuation is a computation and/or estimation of the value of a data set for a given context;

"context" as utilized herein is intended to be broadly construed so as to encompass, for example, surroundings, circumstances, environment, background, settings, characteristics, qualities, attributes, descriptions, and/or the like, that determine, specify, and/or clarify something; in this case, for example, context is used to determine a value of data;

"client" as utilized herein is intended to be broadly construed so as to encompass, for example, an end user device of a computing system or some other form of cloud computing platform;

"structured data" as utilized herein is intended to be broadly construed so as to encompass, for example, data that resides in fixed fields within a document, record or file, e.g., data contained in relational databases and spreadsheets; and "unstructured data" as utilized herein is intended to be broadly construed so as to encompass, for example, data that is not considered structured data (in which case, some "semi-structured" data asset may also be considered unstructured data), e.g., documents, free form text, images, etc.;

"metadata" as utilized herein is intended to be broadly construed so as to encompass, for example, data that describes other data, i.e., data about other data; and "data flow" as utilized herein is intended to be broadly construed so as to encompass, for example, a process comprising one or more transformations associated with data as the data traverses a system.

Methods have been proposed to process data from a centralized data lake environment. The term "data lake" as illustratively utilized herein refers to a centralized data repository that typically stores unstructured data for an enterprise without optimization for particular predetermined types of analysis or other processing. By way of one example only, in such a centralized data lake environment, applications assign value to data sets from the data lake environment by building lineage graphs and applying statements of value to the nodes in those graphs.

In one example, such a graph includes initial nodes representing data sources, intermediate nodes connected to the initial nodes representing results of some transformation of the data of the initial nodes, and final nodes connected to the initial nodes and/or intermediate nodes representing results of further transformations of the data of the initial nodes and/or intermediate nodes. The final nodes may represent top-level business insight attributable to the data sources and transformations. The business insight serves to estimate some monetary impact for a given enterprise. Such monetary impact can also be cascaded through the graph structure and assigned to individual nodes. Valuation algorithms and valuation assignment can be controlled and managed efficiently in this type of centralized data lake environment. For example, data scientists can experiment with analytic models that raise the value of data by using analytic sandboxes and other centralized techniques.

It is realized herein that highly distributed systems (e.g., IoT ecosystems) would similarly benefit from a valuation approach. As data is collected from sensors at the furthermost edges of an IoT environment, it often undergoes important transformations that improve its value. These transformations are typically more lightweight than the analytic models built by data scientists in a data lake. The term "lightweight" as used in this context illustratively refers to a process that has a relatively small processing and/or memory footprint such that the process can be operated faster and more efficiently than analytic processes run in a data lake context. In one or more illustrative embodiments, such lightweight transformation processes (models) can be thought of as "data flows."

Figure 1:
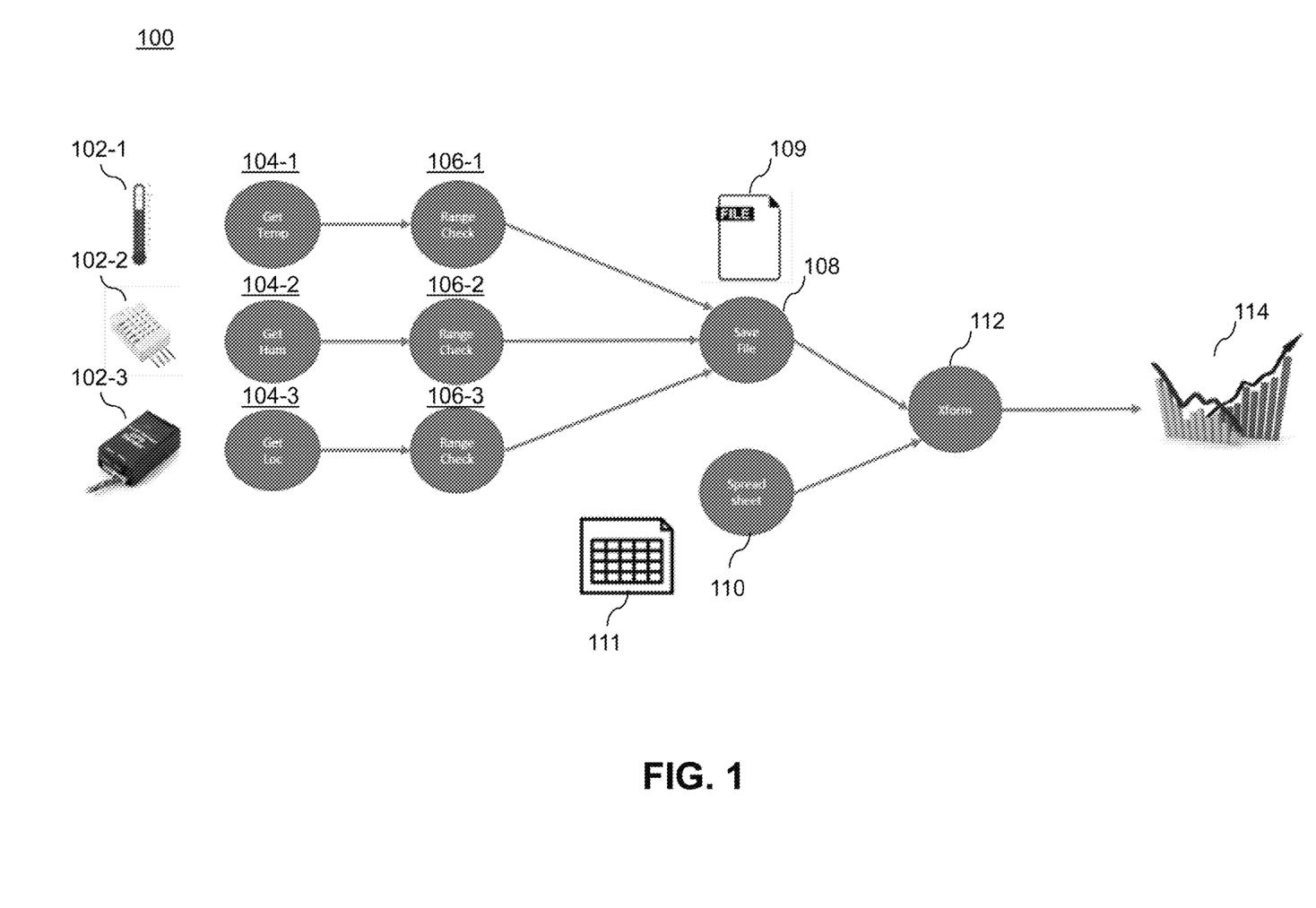
FIG. 1 illustrates an example of a gateway-based data flow with which one or more illustrative embodiments may be implemented.

FIG. 1 illustrates an example of gateway-based data flow 100. As shown, in this example, three different sensor devices 102-1, 102-2, and 102-3 (temperature, humidity, global positioning system or GPS, respectively) generate readings that are obtained at steps 104-1, 104-2, and 104-3, respectively, and potentially transformed and/or cleaned by range check software at steps 106-1, 106-2, and 106-3, respectively, before being stored in step 108 in a file 109. The data flow obtains in step 110 a local copy of a spreadsheet 111 that contains, for example, corporate or vendor-specific data that provides valuable business insight. The file 109 and the spreadsheet 111 are provided to a transformation node 112 (e.g., Xform) that combines the file 109 and the spreadsheet 111 to provide some form of business insight 114 (e.g., trending or thresholding reports) that may then get forwarded to higher level business processes. In some embodiments, data flows (e.g., data flow 100) can be designed using drag-and-drop tools such as Boomi™ (Dell Technologies) which is an on-demand multi-tenant cloud integration platform for connecting cloud and on-premises applications and data, and enabling customers to design cloud-based integration processes and transfer data between cloud and on-premises applications.

It is realized herein that data flows, like analytic models, are executables. The term "executable" as illustratively used herein refers to the ability to perform indicated tasks on a computer or other processing device according to encoded instructions. As such "executables" are processes, code, instructions, etc. that are able to be executed by a computer or other processing device. Further it is realized herein that executables, like any data, can be assigned value. If a particular data flow has an extremely high value, it may make sense to deploy that data flow across a larger set of gateways. However, it is also realized herein that such data flow valuation and deployment have a significant number of challenges associated with it. Some of these challenges are outlined below.

Figure 2:
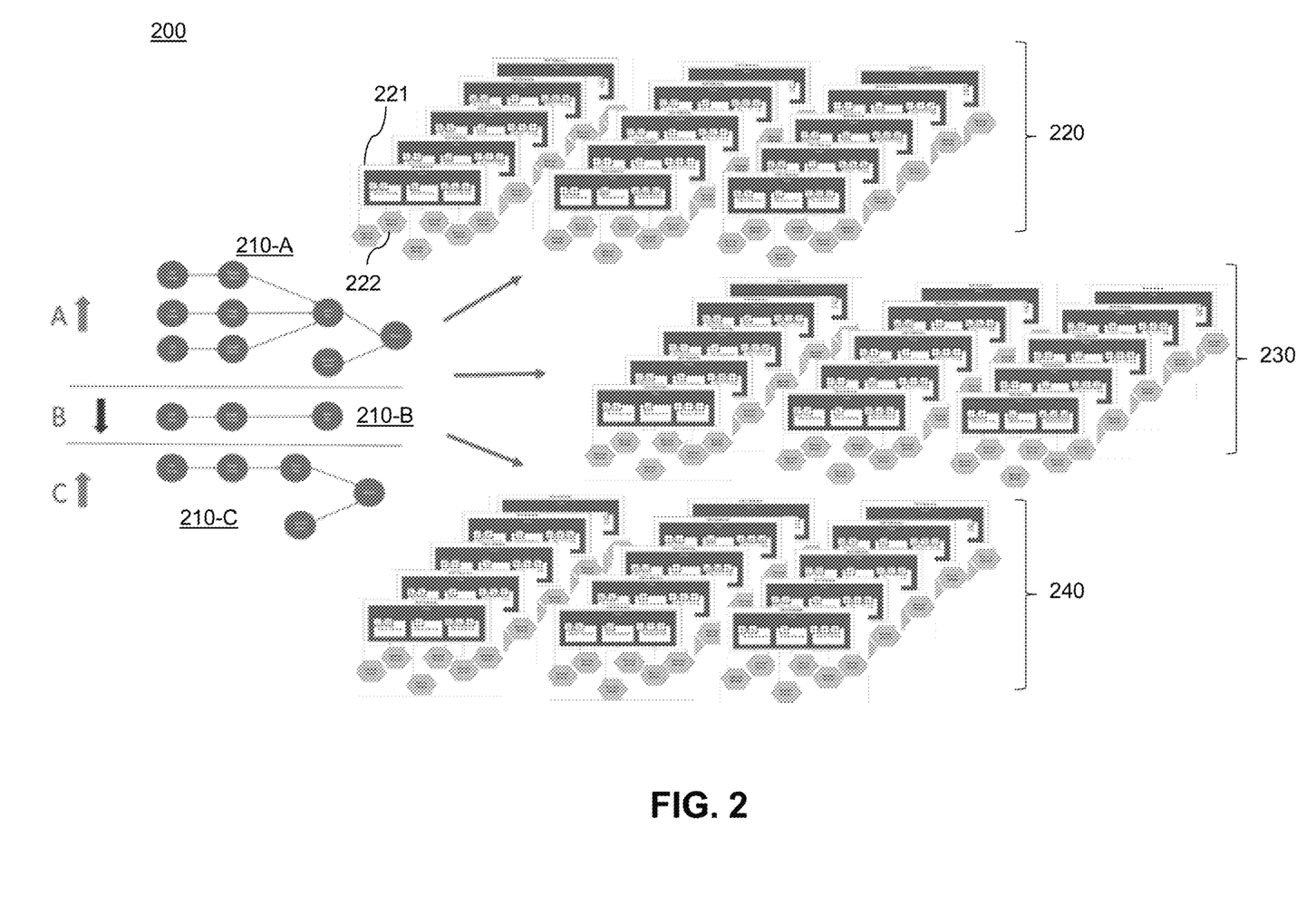
FIG. 2 illustrates an example of applying high-value data flows across an IoT ecosystem with which one or more illustrative embodiments may be implemented.

FIG. 2 depicts an example 200 of a set of corporate data flows A, B, and C (210-A, 210-B, and 210-C, respectively) that fluctuate in value over time, and sets of gateway nodes 220, 230, and 240 that may increase the value of their data by applying one or more of the data flows. Note that each set of gateway nodes has a plurality of gateway nodes (e.g., gateway 221 being one example of the plurality of gateway nodes), and each gateway node has a plurality of sensors (e.g., sensor 222 being one example of the plurality of sensors) coupled thereto.

As depicted by the arrows on the left-hand side of FIG. 2, data flows A and C are increasing in value, while data flow B is decreasing in value. It is to be appreciated that dozens of gateway nodes depicted by the sets 220, 230, and 240 are typically spread across multiple geographies and may or may not benefit from adopting data flows A, B, and/or C. Note that this simplified depiction does not reflect the fact that there may be hundreds of data flows and thousands of gateway devices in a given highly distributed system.

However, it is realized herein that valuation and deployment of data flows A, B, and/or C face the following challenges.

Inability to Accurately Value Corporate Data Flows. There are no existing techniques for valuing data flows that are running in a decentralized fashion.

Decentralized Catalogue of Available Data Flows. Data flow catalogues are currently kept in a centralized location (e.g., within the limits of a corporate firewall, or within a cloud environment). There is no existing ability for decentralized gateways to access or browse such a catalogue.

Relevance of individual data flows. A given gateway does not have the ability to determine which data flow may or may not be relevant for that specific gateway environment. As a result, a given gateway may have visibility into any number of high-value data flows but determining which data flow is likely to enrich the value of that gateway's data is currently not possible.

Deployment of data flows across a decentralized system. If a gateway was to determine that a high-value data flow is relevant and available, there is currently no way to efficiently (and in a common fashion) download that data flow to a given gateway device.

Protection against rogue data flows. If a malicious actor wishes to publish data flows there is currently no mechanism to determine the original author of the data flow nor is there any way to determine whether or not that data flow has been qualified and cleared for deployment.

Access Control for Data Flows. There is currently no way to control an authorized distribution list of who may browse and/or access/download from the catalogue of data flows. There may be a desire to restrict certain data flows to certain devices (e.g., only gateways of a particular vendor have access to newer, more valuable data flows).

Retirement of low-value data flows. Should a data flow be proven to deliver low (or no) value in terms of the data it produces, there is currently no mechanism to periodically prune these data flows from the catalogues (as well as eliminate them from operation on given gateways).

Illustrative embodiments overcome the above and other challenges by leveraging a combination of valuation techniques and decentralization technologies that create a secure, accessible catalogue of data flows that can be dynamically created and deployed across a decentralized ecosystem.

In accordance with one or more illustrative embodiments, a data flow is considered an executable with a defined set of inputs and outputs. When a new data flow is created, in some embodiments, the executable is placed in a decentralized storage system. One example of a decentralized storage system is the Interplanetary File System or IPFS.

IPFS is an open-source protocol that provides a decentralized method of storing and sharing files relying on a content-addressable, peer-to-peer hypermedia distribution. The compute nodes in an IPFS network form a distributed file system. IPFS operates by coupling devices/nodes with the same system of files. More particularly, IPFS uses a distributed hash table (DHT) with a block exchange (BitSwap) and namespace methodology that operates across disparate devices and unreliable networks. IPFS operates similarly to a torrent system, except that rather than exchanging media, IPFS exchanges objects based on a key-value data store. Any type of content can be inserted into the data sharing system, and the system returns a key in the form of a hash value) that can be used to retrieve the content from a node that has it stored thereon at any time. Accordingly, IPFS is a content addressing protocol instead of a location addressing protocol. That is, the hash value is independent of the origin of the data set and can be hosted anywhere in the system.

In one example, the IPFS system is further described in J. Benet, "IPFS—Content Addressed, Versioned, P2P File System," 2014, the disclosure of which is incorporated by reference herein in its entirety. However, illustrative embodiments are not limited to this particular data storage network and alternative systems may be employed.

Figure 3:
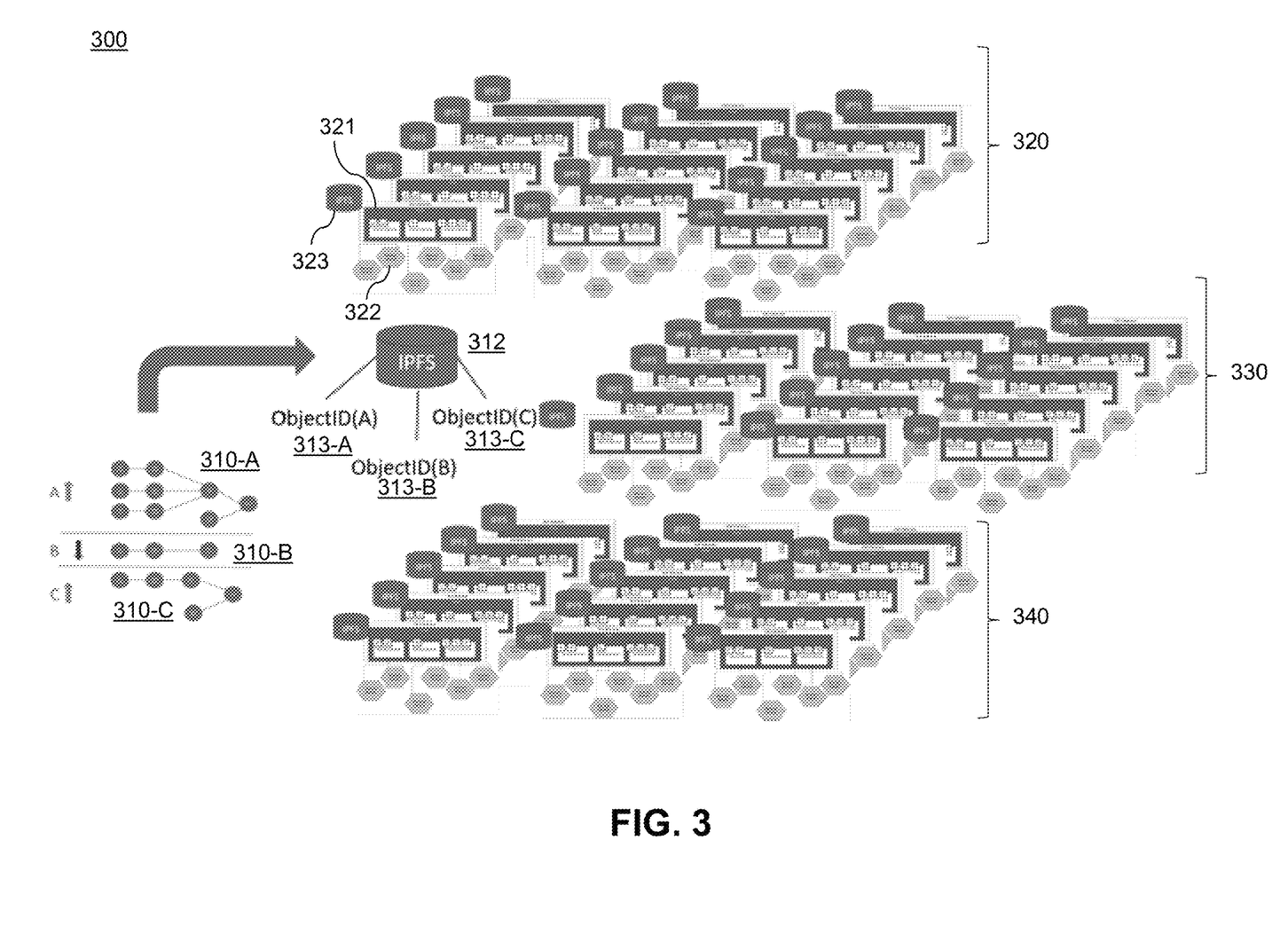
FIG. 3 illustrates a decentralized data flow storage system according to an illustrative embodiment.

FIG. 3 illustrates a decentralized data flow storage system 300, according to an illustrative embodiment, comprising a set of executable data flows A, B, and C (310-A, 310-B, and 310-C, respectively) that fluctuate in value over time, and sets of gateway nodes 320, 330, and 340 that may increase the value of their data by applying one or more of these data flows. Note that each set of gateway nodes has a plurality of gateway nodes (e.g., gateway 321 being one example of the plurality of gateway nodes), and each gateway node has a plurality of sensors (e.g., sensor 322 being one example of the plurality of sensors) coupled thereto. As depicted by the arrows on the left-hand side of FIG. 3, data flows A and C are increasing in value, while data flow B is decreasing in value.

Furthermore, decentralized data flow storage system 300 includes a decentralized file system generally depicted as IPFS 312 which, as described above, is content-addressable storage-based file system. IPFS 312 is composed of a plurality of IPFS nodes. As illustrated, each gateway node in the system has an IPFS node (e.g., IPFS 323 being one example of the IPFS nodes) that enables each gateway node to access and browse every data flow that is stored within IPFS 312. In alternative embodiments, each of at least a subset of the gateway nodes has an IPFS application programming interface (API) to a nearby IPFS node that is dedicated to a group of gateways.

Each data flow A, B, and C is assigned an object ID (e.g., a content address) 313-A, 313-B, and 313-C, respectively, which is used by a gateway via its corresponding IPFS node 323 to retrieve one or more of the data flows from nodes upon which they are stored. In illustrative embodiments, the object ID is a unique, cryptographically-generated (from the executable flow content) object ID. Accordingly, each gateway node in the sets of gateways 320, 330, and 340 has access to the exact same published objects via the object IDs. Therefore, if a gateway becomes aware of a high-value data flow (or if an administrator decides to have the gateway perform a given data flow), the gateway accesses the data flow directly by performing a read operation through its corresponding IPFS node 323 to obtain and download the specific data flow (A, B, and/or C) for execution thereon. As such, despite the fact that the various gateways in system 300 are geographically dispersed, data flows are efficiently and securely deployed to the gateways.

Once a data flow has been published to decentralized storage system 300, in one or more illustrative embodiments, a distributed ledger (e.g., blockchain) is used to create an immutable record (entry) of that data flow. The insertion of this entry into a distributed ledger system is immediately recognized by any gateway device that is connected to the system.

Figure 4:
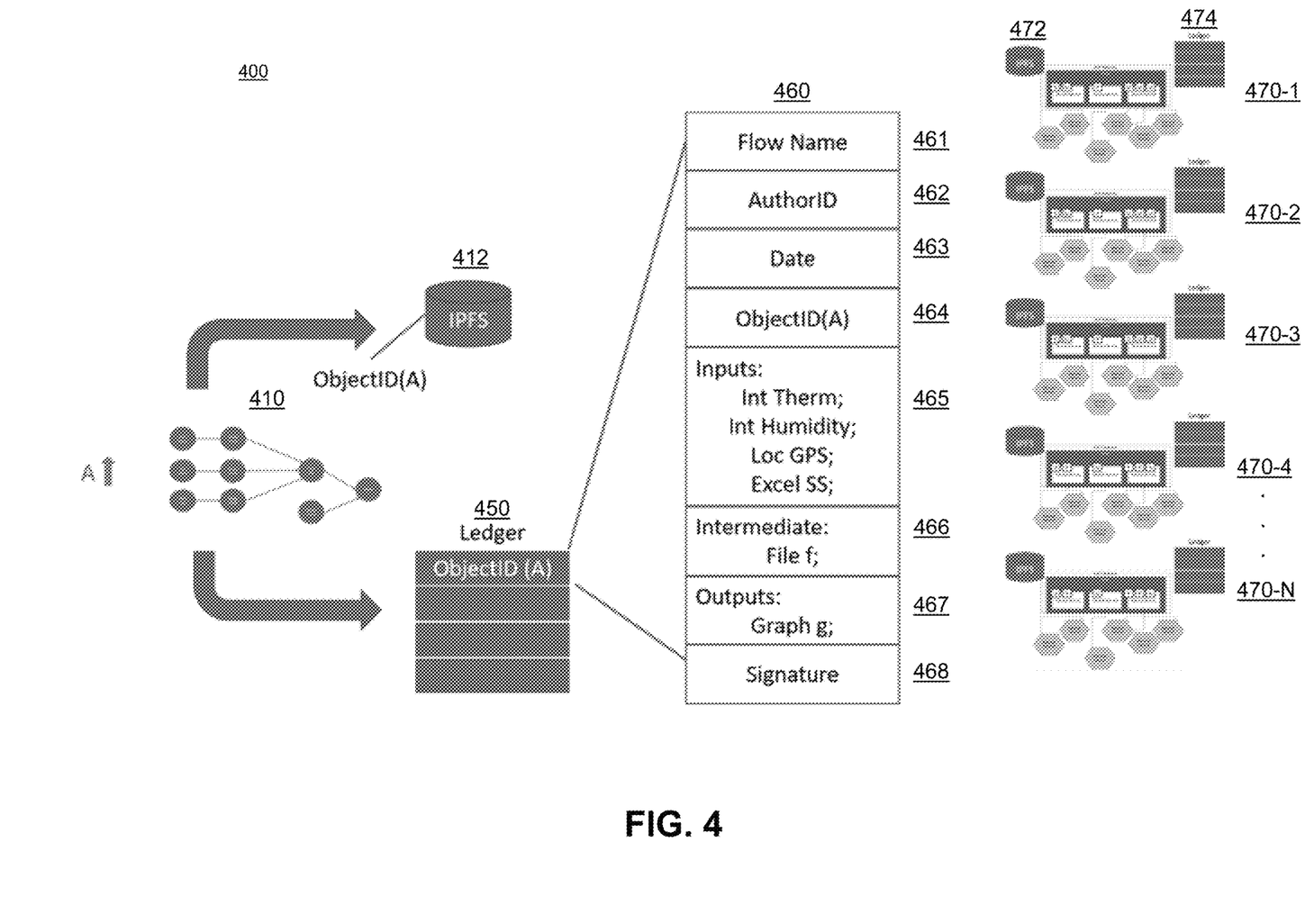
FIG. 4 illustrates a process for creating a ledger entry for a new data flow according to an illustrative embodiment.

FIG. 4 illustrates a process 400 for creating a ledger entry for a new data flow 410 according to an illustrative embodiment. As shown on the left-hand side of FIG. 4, each gateway node in the system is configured with an IPFS node 412 and a ledger node 450. The ledger node 450 is part of a distributed ledger system, e.g., a blockchain system.

As used herein, the terms "blockchain," "ledger" and "distributed ledger" may be used interchangeably. As is known, the blockchain or distributed ledger protocol is implemented via a distributed, decentralized computer network of compute nodes. A given one of the blockchain compute nodes (ledger nodes) resides on a client (e.g., a gateway node) or the client otherwise has access to a blockchain compute node. The compute nodes are operatively coupled in a peer-to-peer communications protocol. In the computer network, each compute node is configured to maintain a blockchain which is a cryptographically secured record or ledger of data blocks that represent respective transactions within a given computational environment. The blockchain is secured through use of a cryptographic hash function. A cryptographic hash function is a cryptographic function which takes an input (or "message") and returns a fixed-size alphanumeric string, which is called the hash value (also a message digest, a digital fingerprint, a digest, or a checksum). Each blockchain is thus a growing list of data records hardened against tampering and revision, and typically includes a timestamp, current transaction data, and information linking it to a previous block. More particularly, each subsequent block in the blockchain is a data block that includes a given transaction(s) and a hash value of the previous block in the chain, i.e., the previous transaction. That is, each block is typically a group of transactions. Thus, advantageously, each data block in the blockchain represents a given set of transaction data plus a set of all previous transaction data. In digital ledger technologies such as blockchain, an underlying consensus algorithm is typically used to validate new transactions before they are added to the distributed ledger. Typically, for example, the new transaction is broadcast to all nodes within the network, inspected, a consensus is reached, and the entry is formally committed to the blockchain based on whether consensus is reached that the entry is validated.

In the case of a "bitcoin" type implementation of a blockchain distributed ledger, the blockchain contains a record of all previous transactions that have occurred in the bitcoin network. The bitcoin system was first described in S. Nakamoto, "Bitcoin: A Peer to Peer Electronic Cash System," 2008, the disclosure of which is incorporated by reference herein in its entirety.

A key principle of the blockchain is that it is trusted. That is, it is critical to know that data in the blockchain has not been tampered with by any of the compute nodes in the computer network (or any other node or party). For this reason, a cryptographic hash function is used. While such a hash function is relatively easy to compute for a large data set, each resulting hash value is unique such that if one item of data in the blockchain is altered, the hash value changes. However, it is realized that given the constant generation of new transactions and the need for large scale computation of hash values to add the new transactions to the blockchain, the blockchain protocol rewards compute nodes that provide the computational service of calculating a new hash value. In the case of a bitcoin network, a predetermined number of bitcoins are awarded for a predetermined amount of computation. The compute nodes thus compete for bitcoins by performing computations to generate a hash value that satisfies the blockchain protocol. Such compute nodes are referred to as "miners." Performance of the computation of a hash value that satisfies the blockchain protocol is called "proof of work." While bitcoins are one type of reward, blockchain protocols can award other measures of value (monetary or otherwise) to successful miners.

It is to be appreciated that the above description represents an illustrative implementation of the blockchain protocol and that embodiments are not limited to the above or any particular blockchain protocol implementation. As such, other appropriate processes may be used to securely maintain and add to a set of data in accordance with embodiments of the invention. For example, distributed ledgers such as, but not limited to, R3 Corda, Ethereum, and Hyperledger may be employed in alternative embodiments.

Returning to FIG. 4, it is to be understood that when new data flow 410 (having an object ID, e.g., ObjectID(A)) is inserted into a decentralized storage system (which IPFS 412 is a part of), a set of metadata 460 describing that entry is inserted into ledger node 450. As per the blockchain description above, metadata 460 is considered a transaction or transaction data. Note that this ledger system is also accessible to each gateway of the gateway ecosystem, as highlighted in the right-hand side of FIG. 4. More particularly, as shown, each gateway 470-1, 470-2, 470-3, 470-4, . . . , 470-N has an IPFS node 472 and a ledger node 474 residing thereon or otherwise accessible thereto.

The entry (metadata 460) in the ledger is made up of a number of different subfields. Note that, in certain embodiments, some subset of these fields may actually be placed within the object (data flow) as well. As shown in the example metadata 460, subfields include:

(i) The name of the data flow 461;
(ii) The identity of the data flow creator (author) 462;
(iii) The date that the data flow was created 463;
(iv) The immutable object ID of the data flow 464;
(v) The raw inputs that are received by the data flow 465 (e.g., recall from FIG. 1 example that the input sensor data can be from a temperature sensor, a humidity sensor, and a GPS sensor);
(vi) Intermediate results that are produced by the data flow (e.g., range check, combination of a sensor data file and a spreadsheet) 466;
(vii) The output of the data flow (e.g., a business insight report such as a graph) 467; and
(viii) The digital signature of the author 468.

Once data flows are published to a ledger, in one or more illustrative embodiments, the gateway ecosystem is able to detect that a new flow has been published. For example, each gateway can be notified of the new data flow through its corresponding IPFS node 472, ledger node 474, or both. The gateway can immediately query the new ledger entry to determine the relevance of the new data flow. In the example of FIG. 4, if some gateways are monitoring the flow of liquid, they may have no interest in a data flow that processes temperature and humidity inputs. However, if the gateway inspects the input section 465 of the ledger entry and determines that the flow may be relevant, the gateway can issue a request to download and execute the data flow.

The distributed ledger can be considered a decentralized catalog of data flows. Once relevant data flows are discovered in the decentralized catalog, a gateway can deploy one or more of the relevant data flows in order to improve the value of the data that the gateway produces. It is understood that the gateway has established relevancy by inspecting the distributed ledger and determining a good match of data flow inputs and outputs. The ledger entry for a relevant data flow also contains the name (461) and object identifier (464) that can be used to fetch the data flow from the decentralized data storage system (IPFS) and deploy the data flow. The permission system of the decentralized data storage system may limit which gateways can access the data. Alternatively, the gateway may need to negotiate with the author (462) of the data flow to obtain permission to access the data flow by using one of a variety of techniques. One such technique is to call a smart contract on the ledger. In some embodiments, this negotiation also involves the transfer of cryptocurrencies in payment to the author. The identity of the author may also contain a wallet address through which to make payments.

Another benefit of this approach is that this transaction can create a record on the ledger which permanently records the download and deployment of the data flow onto the ledger, which can assist with tracking data flow distribution and configuration across an ecosystem.

Once the ability to download new data flows to a gateway has been accomplished, these data flows begin operation and valuation techniques that can be applied to associate value to them.

Figure 5:
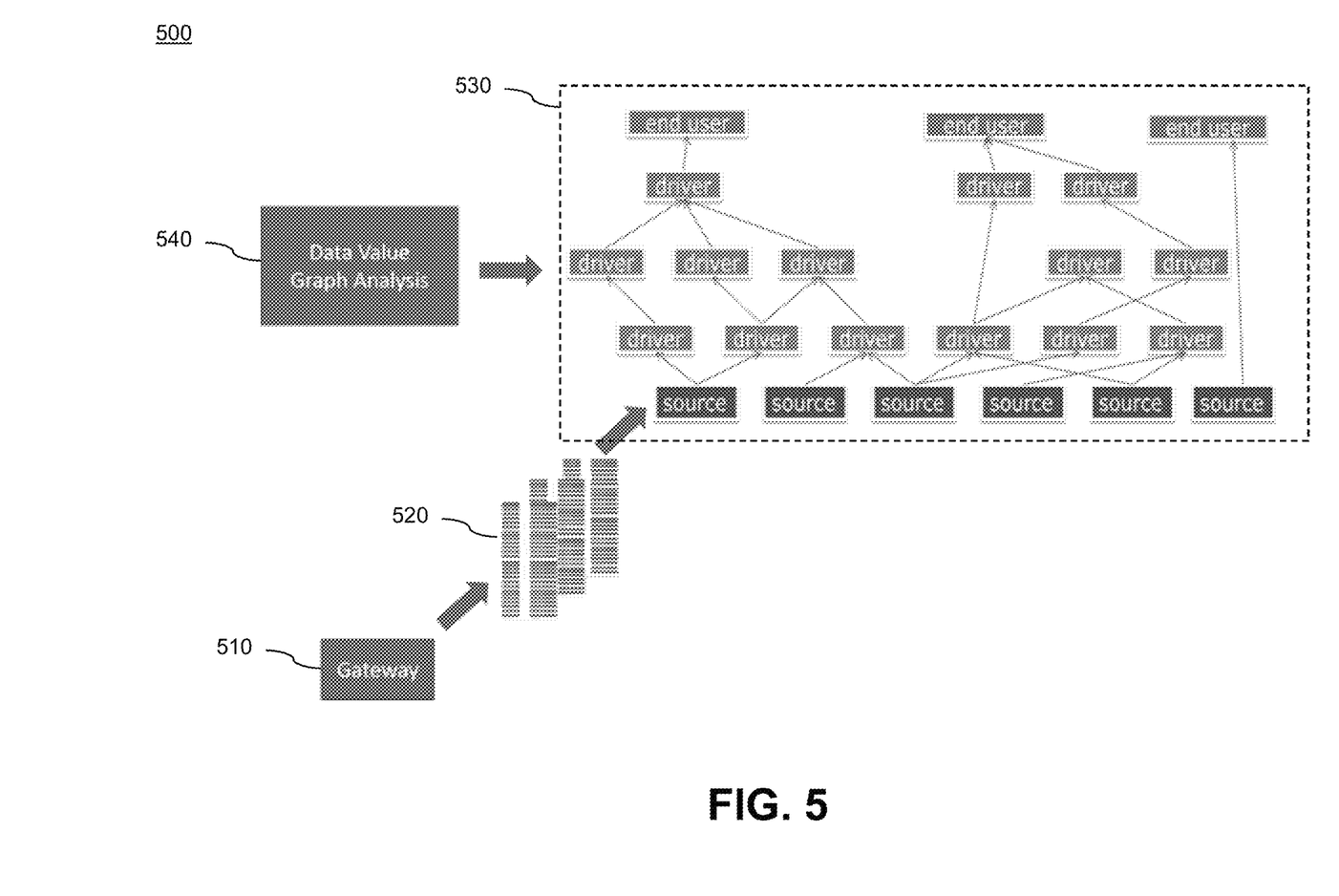
FIG. 5 illustrates a process for valuation of raw gateway elements according to an illustrative embodiment.

FIG. 5 illustrates a process 500 used to assign business value to raw gateway data. The process is an illustrative technique wherein raw gateway data is shipped up to a data lake. One or more data valuation algorithms (e.g., graph analysis) are run, and statements of value are subsequently pushed back down and recorded at the gateway level.

A gateway participates in events (containing a "timestamp" and coming from a given sensor with a "device name") generating zero or more readings (name/value pairs). Gateways can generate hundreds and thousands of these types of records and forward them to higher-level servers and/or cloud analytics systems. According to illustrative embodiments, these data elements are then routed into one or more valuation algorithms, as depicted in FIG. 5.

As shown in FIG. 5, a sensor data valuation system environment 500 comprises a gateway 510 that generates sensor data elements 520 (e.g., readings) and provides them to a graphical-based data valuation framework 530 which is accessible by a data value graph analysis module 540, as will be further explained below. The data valuation framework depicted as 530 in FIG. 5 is an example of a content workflow valuation algorithm that records the workflow and usage of content. In this embodiment, valuation framework 530 represents the application of business logic and/or other data analytics on the sensor data elements 520 and assignment of value (measure of valuation, as used here) to a piece of content based on such context. More particularly, valuation framework 530 and analysis module 540 track business logic/data analytic activity in the form of a directed acyclic graph and assigns top-level business value to end user results (e.g., how much money was made or saved by using the data). This value is then cascaded down through intermediate (driver) data to the original "source" data (sensor data elements 520) used to generate the business value. By way of example, content workflow valuation techniques are further described in U.S. Ser. No. 15/072,557, filed on Mar. 17, 2016 and entitled "Metadata-based Data Valuation" and U.S. Ser. No. 15/135,817, filed on Apr. 22, 2016 and entitled "Data Value Structures," the disclosures of which are incorporated by reference herein in their entireties.

It is to be appreciated that the valuation framework 530 and analysis module 540 represent only one example of a valuation algorithm that can be applied to the sensor data elements 520. One or more other valuation algorithms can be applied in various alternative embodiments. For example, alternative valuation frameworks that can be employed to generate valuation for sensor data elements 520 include, but are not limited to:

content processing valuation techniques as described in U.S. Ser. No. 14/863,783, filed on Sep. 24, 2015 and entitled "Unstructured Data Valuation," the disclosure of which is incorporated by reference herein in its entirety;

data protection valuation techniques as described in U.S. Ser. No. 15/136,327, filed on Apr. 22, 2016 and entitled "Calculating Data Value Via Data Protection Analytics," the disclosure of which is incorporated by reference herein in its entirety; and content ingest valuation techniques as described in U.S. Ser. No. 15/135,790, filed on Apr. 22, 2016 and entitled "Data Valuation at Content Ingest," the disclosure of which is incorporated by reference herein in its entirety.

Other valuation algorithms can be used to provide further valuation metrics. By way of non-limiting example, one or more of the data valuation models described in D. Laney, "The Economics of Information Assets," The Center for Infonomics, Smarter Companies presentation, September 2011, may be employed as a data valuation algorithm used by one or more illustrative embodiments. Such valuation models include a set of non-financial models and a set of financial models. The non-financial models include: (i) an intrinsic value of information (IVI) model, which represents a measure of a value of the correctness, completeness, and exclusivity (scarcity) of the data set; (ii) a business value of information (BVI) model, which represents a measure of a value of the sufficiency and relevance of the data set for specific purposes; and (iii) a performance value of information (PVI) model, which represents a measure of a value of how the data set affects key business drivers. The financial models include: (i) a cost value of information (CVI) model, which represents a measure of a value of the cost of losing the data set; (ii) a market value of information (MVI) model, which represents a measure of a value of the amount that could be obtained by selling or trading the data set; and (iii) an economic value of information (EVI) model, which represents a measure of a value of how the data set contributes to a financial bottom line.

Regardless of the valuation algorithm used, in one or more illustrative embodiments, an end result is that a file (source data that is filled with sensor data) now has a valuation score(s) associated with it (e.g., financial and/or numerical). Once a file containing sensor data has been valued, a separate algorithm pushes the value back down to the gateway.

Figure 6:
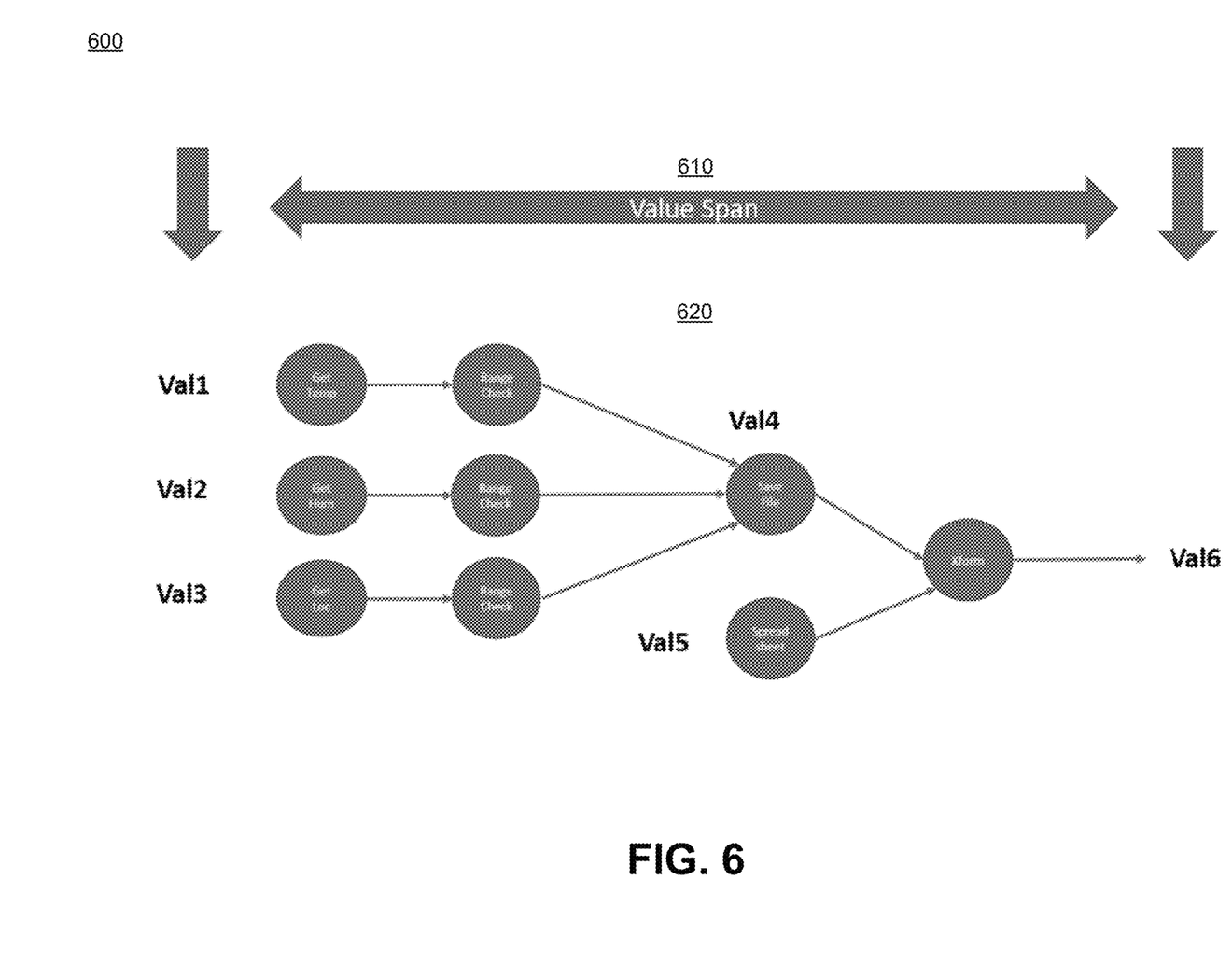
FIG. 6 illustrates a process for calculating the value of a data flow via spanning according to an illustrative embodiment.

FIG. 6 illustrates a process 600 for calculating value 610 of a data flow 620 via data flow value spanning. Assume that the values (Val1, Val2, Val3, Val4, Val5, and Val6) are values computed by one or more of the data valuation techniques mentioned above in the context of FIG. 5 or otherwise mentioned herein.

More particularly, in FIG. 6, assume that Val1 contains the value assigned to the temperature sensor (102-1) data depicted in FIG. 1, Val2 contains the value assigned to the humidity sensor (102-2) data, and Val3 contains the vale assigned to the GPS (102-3) data. After deploying the data flow, the gateway begins to measure its value contribution by using any number of algorithms that span the data flow. The term "value spanning" as used herein illustratively means to take into account multiple valuation measures across the data flow, e.g., from input to output. In one illustrative embodiment, the algorithm sums the sensors (Val1+Val2+Val3) and subtracts it from the output of the data flow (Val6). This results in the following equation:

Data Flow Value=Val6−(Val1+Val2+Val3).

Alternative embodiments integrate intermediate values (Val5 and Val6) in an appropriate manner as needed, i.e., Val 4 and Val5 are accounted for in the valuation equation.

The ability of a gateway to measure the value of an operational data flow allows the gateway to publish the results of the valuation. In some embodiments, this valuation is published to the distributed ledger system so that other peer gateways can see the value that another gateway is adding to their sensor data.

In one or more embodiments, the system described herein allows a gateway to identify potentially beneficial data flows, not only through relevance, but by value. There may be multiple "relevant" data flows that could be downloaded to a gateway, but there may be a "most valuable" result that promises to enrich the data more than others. Therefore, advantageously, a gateway can now identify, download, and run the most valuable data flow(s).

Further, in certain embodiments, the ability to publish data flows that can produce measurable value results in an ecosystem where data flow authors are incentivized to create new data flows that provide greater data enrichment and then get paid for the download of each data flow in a data flow marketplace.

Figure 7:
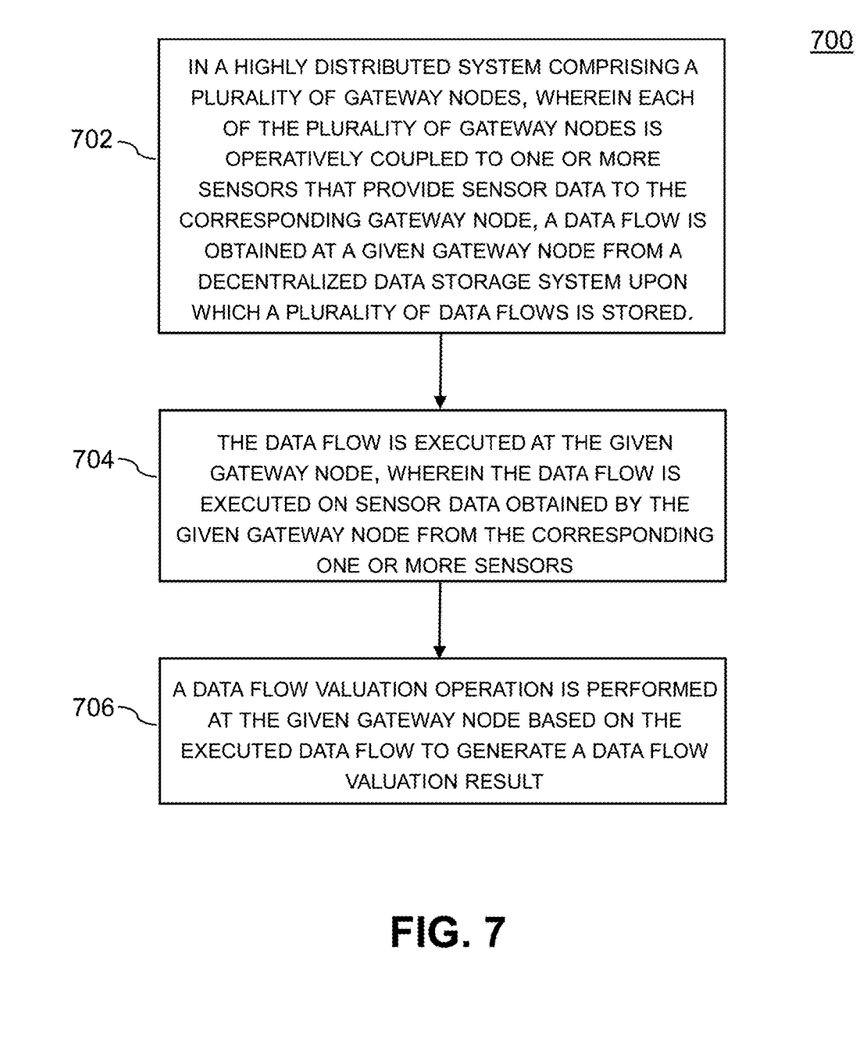
FIG. 7 illustrates a methodology for decentralized data flow valuation and deployment in a highly distributed system according to illustrative embodiments.

Given the illustrative description of techniques described herein, methodology 700 in FIG. 7 comprises the following steps performed in a highly distributed system comprising a plurality of gateway nodes, wherein each of the plurality of gateway nodes is operatively coupled to one or more sensors that provide sensor data to the corresponding gateway node.

Step 702 obtains a data flow at a given gateway node from a decentralized data storage system upon which a plurality of data flows is stored.

Step 704 executes the data flow at the given gateway node, wherein the data flow is executed on sensor data obtained by the given gateway node from the corresponding one or more sensors.

Step 706 performs a data flow valuation operation at the given gateway node based on the executed data flow to generate a data flow valuation result.

In one or more embodiments, the step of performing a data flow valuation operation at the given gateway device based on the executed data flow to generate a data flow valuation result further comprises performing a data flow value spanning operation.

In one or more embodiments, the data flow value spanning operation further comprises utilizing multiple values that span the data flow to generate the data flow valuation result.

In one or more embodiments, one or more of the multiple values utilized to generate the data flow valuation result are obtained from a data valuation operation performed remote from the given gateway node.

In one or more embodiments, the step of obtaining a data flow at a given gateway node from a decentralized data storage system upon which a plurality of data flows is stored further comprises the given gateway node discovering the data flow to be obtained based on data flow-identifying metadata stored in a distributed ledger system, wherein the distributed ledger system maintains respective data flow-identifying metadata for each of the plurality of data flows stored in the decentralized data storage system.

In one or more embodiments, the given gateway node selects the data flow to be obtained based on relevance after reviewing at least a portion of the respective data flow-identifying metadata maintained by the distributed ledger system.

In one or more embodiments, the data flow-identifying metadata for a given data flow comprises one or more of: a data flow name; a data flow author identifier; a data flow creation date; a digital signature of a data flow author; a content address-based identifier for the given data flow useable to obtain the data flow from the decentralized data storage system; and one or more of inputs, intermediate results, and outputs associated with the given data flow.

In one or more embodiments, the given gateway node records one or more events of obtaining, executing, and performing the valuation operation on the distributed ledger system.

In one or more embodiments, the given gateway node selects the data flow to be obtained based on value previously attributed to the data flow by one or more other gateway nodes in the plurality of gateway nodes.

At least portions of the highly distributed system with decentralized data flow valuation and deployment shown in FIGS. 1-7 may be implemented using one or more processing platforms associated with one or more information processing systems. In some embodiments, a given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one. In many embodiments, logic may be executed across one or more physical or virtual processors. In certain embodiments, a virtual processor may be mapped to and executed on or across a portion of one or more virtual or physical processors.

As is apparent from the above, one or more of the processing modules or other components of the highly distributed system with decentralized data flow valuation and deployment shown in FIGS. 1-7 may each run on a computer, server, storage device or other processing platform element. A given such element may be viewed as an example of what is more generally referred to herein as a "processing device." An example of such a processing platform is processing platform 800 shown in FIG. 8.

Figure 8:
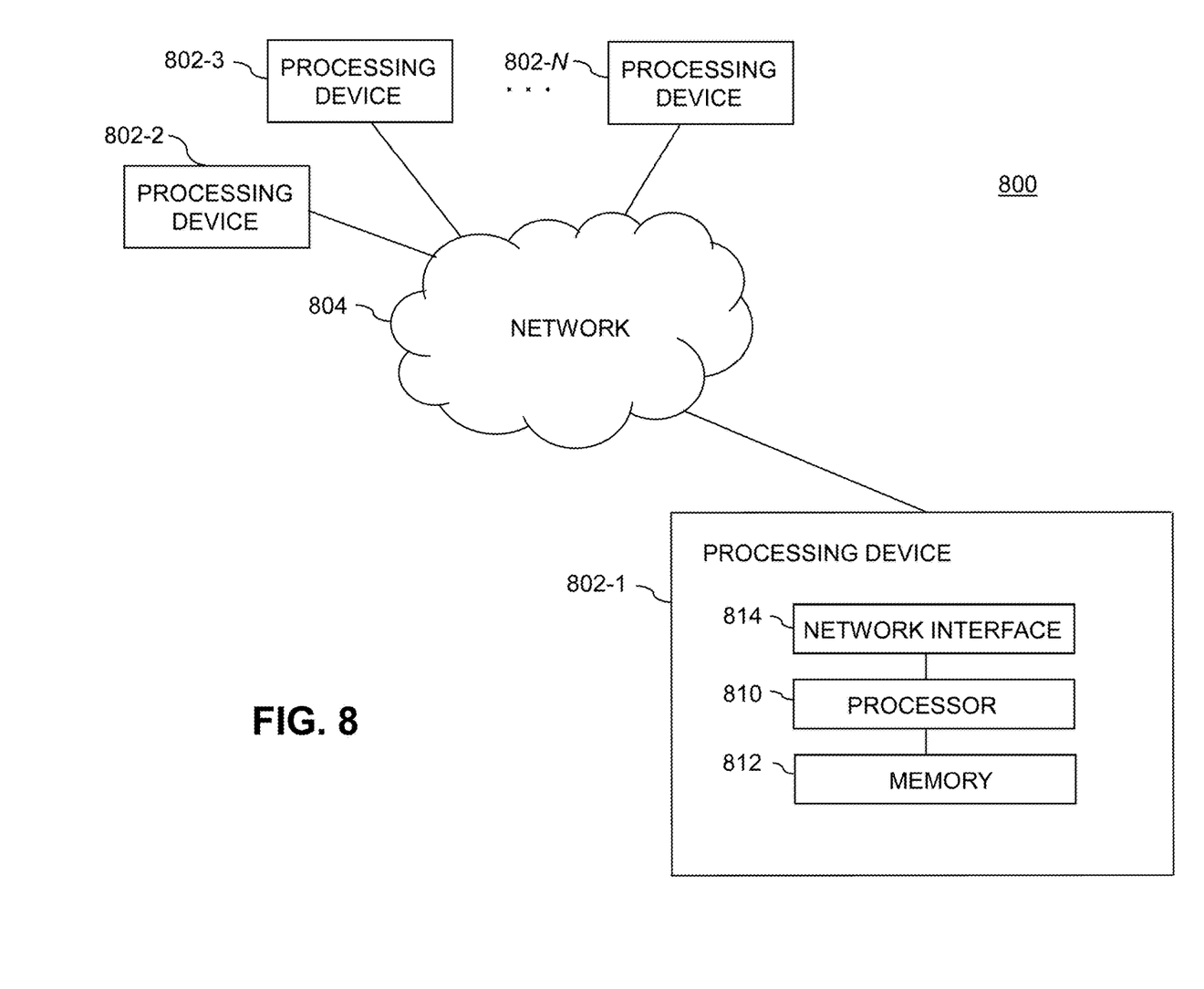
FIG. 8 illustrates a processing platform used to implement a highly distributed system with decentralized data flow valuation and deployment according to an illustrative embodiment.

The processing platform 800 in this embodiment comprises a plurality of processing devices, denoted 802-1, 802-2, 802-3, . . . , 802-N, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Some networks utilized in a given embodiment may comprise high-speed local networks in which associated processing devices communicate with one another utilizing Peripheral Component Interconnect Express (PCIe) cards of those devices, and networking protocols such as InfiniBand, Gigabit Ethernet or Fibre Channel.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA) or other type of processing circuitry, as well as portions or combinations of such circuitry elements.

The memory 812 may comprise random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered embodiments of the present disclosure. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 of the example embodiment of FIG. 8 is network interface circuitry 814, which is used to interface the processing device with the network 804 and other system components and may comprise conventional transceivers.

The other processing devices 802 of the processing platform 800 are assumed to be configured in a manner similar to that shown for processing device 802-1 in the figure.

Again, this particular processing platform is presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the disclosure can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment of a highly distributed system with decentralized data flow valuation and deployment, although in other embodiments a given tenant can have multiple containers. The containers may be utilized to implement a variety of different types of functionality within the system. For example, containers can be used to implement respective cloud compute nodes or cloud storage nodes of a cloud computing and storage system. The compute nodes or storage nodes may be associated with respective cloud tenants of a multi-tenant environment. Containers may be used in combination with other virtualization infrastructure such as virtual machines implemented using a hypervisor.

As another example, portions of a given processing platform in some embodiments can comprise converged infrastructure such as VxRail™, VxRack™ or Vblock® converged infrastructure commercially available from VCE, the Virtual Computing Environment Company, now the Converged Platform and Solutions Division of Dell EMC. For example, portions of a system of the type disclosed herein can be implemented utilizing converged infrastructure.

It should therefore be understood that in other embodiments different arrangements of additional or alternative elements may be used. In many embodiments, at least a subset of these elements may be collectively implemented on a common processing platform, or each such element may be implemented on a separate processing platform.

Also, in other embodiments, numerous other arrangements of computers, servers, storage devices or other components are possible in a highly distributed system with decentralized data flow valuation and deployment. Such components can communicate with other elements of the system over any type of network or other communication media.

As indicated previously, in some embodiments, components of the highly distributed system with decentralized data flow valuation and deployment as disclosed herein can be implemented at least in part in the form of one or more software programs stored in memory and executed by a processor of a processing device. For example, at least portions of the execution environment or other system components are illustratively implemented in one or more embodiments the form of software running on a processing platform comprising one or more processing devices.

It should again be emphasized that the above-described embodiments of the disclosure are presented for purposes of illustration only. Many variations and other alternative embodiments may be used. For example, the disclosed techniques are applicable to a wide variety of other types of systems. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the embodiments. Numerous other alternative embodiments within the scope of the appended claims will be readily apparent to those skilled in the art.

What is claimed is:

1. A method comprising:

in a distributed file system configured as a content-addressable, peer-to-peer hypermedia distribution utilizing a distributed hash table with a block exchange and namespace methodology, the distributed file system comprising a plurality of distributed file system nodes and a plurality of gateway nodes, wherein each gateway node has a corresponding file system node configured to allow each gateway node to access a given data flow that is stored within the distributed file system, wherein each of the plurality of gateway nodes is operatively coupled to a plurality of sensors that provide sensor data to the corresponding gateway node;

obtaining a data flow at a given gateway node from a decentralized data storage system upon which a plurality of data flows is stored, wherein the data flow is assigned a content address which is utilized by the given gateway node via its corresponding distributed file system node to retrieve the data flow from a respective node upon which it is stored;

executing the data flow at the given gateway node, wherein the data flow comprises one or more transformation operations executed on sensor data obtained by the given gateway node from the corresponding plurality of sensors; and performing a data flow valuation spanning operation at the given gateway node based on the executed data flow to generate a data flow valuation result, the data flow valuation result characterizing a valuation of the data flow;

wherein the data flow value spanning operation comprises utilizing multiple value contributions that span changes in valuation resulting from the one or more transformation operations of the data flow to generate the data flow valuation result;

wherein a first value contribution of the multiple values is associated with a first data valuation of first sensor data of a first sensor type of the plurality of sensors, a second value contribution of the multiple values is associated with a second data valuation of second sensor data of a second sensor type of the plurality of sensors different from the first sensor type and a third value contribution of the multiple values is associated with a third data valuation of third sensor data of a third sensor type of the plurality of sensors different from the first sensor type and the second sensor type;

wherein the data flow value spanning operation further comprises reducing an output value of the data flow of the given gateway node by the sum of the first value contribution, the second value contribution and the third value contribution to generate the data flow valuation result; and wherein the steps are performed by at least one processing device comprising a processor and a memory.

2. The method of claim 1, wherein one or more of the multiple values utilized to generate the data flow valuation result are obtained from the data flow valuation spanning operation performed remote from the given gateway node.

3. The method of claim 1, wherein the step of obtaining a data flow at a given gateway node from a decentralized data storage system upon which a plurality of data flows is stored further comprises the given gateway node discovering the data flow to be obtained based on data flow-identifying metadata stored in a distributed ledger system, wherein the distributed ledger system maintains respective data flow-identifying metadata for each of the plurality of data flows stored in the decentralized data storage system.

4. The method of claim 3, wherein the given gateway node selects the data flow to be obtained based on relevance after reviewing at least a portion of the respective data flow-identifying metadata maintained by the distributed ledger system.

5. The method of claim 3, wherein the data flow-identifying metadata for a given data flow comprises one or more of: a data flow name; a data flow author identifier; a data flow creation date; and a digital signature of a data flow author.

6. The method of claim 3, wherein the data flow-identifying metadata for a given data flow comprises a content address-based identifier for the given data flow useable to obtain the data flow from the decentralized data storage system.

7. The method of claim 3, wherein the data flow-identifying metadata for a given data flow comprises information describing one or more of inputs, intermediate results, and outputs associated with the given data flow.

8. The method of claim 3, further comprises the given gateway node recording one or more events of obtaining, executing, and performing the data flow valuation spanning operation on the distributed ledger system.

9. An article of manufacture comprising a non-transitory processor-readable storage medium having stored therein program code of one or more software programs, wherein the program code when executed by at least one processing device causes the processing device to perform steps of:

in a distributed file system configured as a content-addressable, peer-to-peer hypermedia distribution utilizing a distributed hash table with a block exchange and namespace methodology, the distributed file system comprising a plurality of distributed file system nodes and a plurality of gateway nodes, wherein each gateway node has a corresponding file system node configured to allow each gateway node to access a given data flow that is stored within the distributed file system, wherein each of the plurality of gateway nodes is operatively coupled to a plurality of sensors that provide sensor data to the corresponding gateway node;

obtaining a data flow at a given gateway node from a decentralized data storage system upon which a plurality of data flows is stored, wherein the data flow is assigned a content address which is utilized by the given gateway node via its corresponding distributed file system node to retrieve the data flow from a respective node upon which it is stored;

executing the data flow at the given gateway node, wherein the data flow comprises one or more transformation operations executed on sensor data obtained by the given gateway node from the corresponding plurality of sensors; and performing a data flow valuation spanning operation at the given gateway node based on the executed data flow to generate a data flow valuation result, the data flow valuation result characterizing a valuation of the data flow;

wherein the data flow value spanning operation comprises utilizing multiple value contributions that span changes in valuation resulting from the one or more transformation operations of the data flow to generate the data flow valuation result;

wherein a first value contribution of the multiple values is associated with a first data valuation of first sensor data of a first sensor type of the plurality of sensors, a second value contribution of the multiple values is associated with a second data valuation of second sensor data of a second sensor type of the plurality of sensors different from the first sensor type and a third value contribution of the multiple values is associated with a third data valuation of third sensor data of a third sensor type of the plurality of sensors different from the first sensor type and the second sensor type; and wherein the data flow value spanning operation further comprises reducing an output value of the data flow of the given gateway node by the sum of the first value contribution, the second value contribution and the third value contribution to generate the data flow valuation result.

10. The article of claim 9, wherein the step of obtaining a data flow at a given gateway node from a decentralized data storage system upon which a plurality of data flows is stored further comprises the given gateway node discovering the data flow to be obtained based on data flow-identifying metadata stored in a distributed ledger system, wherein the distributed ledger system maintains respective data flow-identifying metadata for each of the plurality of data flows stored in the decentralized data storage system.

11. The article of claim 10, wherein the given gateway node selects the data flow to be obtained based on relevance after reviewing at least a portion of the respective data flow-identifying metadata maintained by the distributed ledger system.

12. An apparatus comprising at least one processing device, wherein the at least one processing device comprises a processor coupled to a memory configured to:

in a distributed file system configured as a content-addressable, peer-to-peer hypermedia distribution utilizing a distributed hash table with a block exchange and namespace methodology, the distributed file system comprising a plurality of distributed file system nodes and a plurality of gateway nodes, wherein each gateway node has a corresponding file system node configured to allow each gateway node to access a given data flow that is stored within the distributed file system, wherein each of the plurality of gateway nodes is operatively coupled to a plurality of sensors that provide sensor data to the corresponding gateway node;

obtain a data flow at a given gateway node from a decentralized data storage system upon which a plurality of data flows is stored, wherein the data flow is assigned a content address which is utilized by the given gateway node via its corresponding distributed file system node to retrieve the data flow from a respective node upon which it is stored;

execute the data flow at the given gateway node, wherein the data flow comprises one or more transformation operations executed on sensor data obtained by the given gateway node from the corresponding plurality of sensors; and perform a data flow valuation spanning operation at the given gateway node based on the executed data flow to generate a data flow valuation result, the data flow valuation result characterizing a valuation of the data flow;

wherein the data flow value spanning operation comprises utilizing multiple value contributions that span changes in valuation resulting from the one or more transformation operations of the data flow to generate the data flow valuation result;

wherein a first value contribution of the multiple values is associated with a first data valuation of first sensor data of a first sensor type of the plurality of sensors, a second value contribution of the multiple values is associated with a second data valuation of second sensor data of a second sensor type of the plurality of sensors different from the first sensor type and a third value contribution of the multiple values is associated with a third data valuation of third sensor data of a third sensor type of the plurality of sensors different from the first sensor type and the second sensor type; and wherein the data flow value spanning operation further comprises reducing an output value of the data flow of the given gateway node by the sum of the first value contribution, the second value contribution and the third value contribution to generate the data flow valuation result.

13. The apparatus of claim 12, wherein obtaining a data flow at a given gateway node from a decentralized data storage system upon which a plurality of data flows is stored further comprises the given gateway node discovering the data flow to be obtained based on data flow-identifying metadata stored in a distributed ledger system, wherein the distributed ledger system maintains respective data flow-identifying metadata for each of the plurality of data flows stored in the decentralized data storage system.

14. The apparatus of claim 13, wherein the given gateway node selects the data flow to be obtained based on at least:
relevance after reviewing at least a portion of the respective data flow-identifying metadata maintained by the distributed ledger system.

15. The method of claim 1, including at least two of the given gateway nodes.

16. The article of claim 9, including at least two of the given gateway nodes.

17. The apparatus of claim 12, including at least two of the given gateway nodes.

18. The article of claim 10, wherein the data flow-identifying metadata for a given data flow comprises a content address-based identifier for the given data flow useable to obtain the data flow from the decentralized data storage system.

19. The apparatus of claim 13, wherein the data flow-identifying metadata for a given data flow comprises a content address-based identifier for the given data flow useable to obtain the data flow from the decentralized data storage system.

20. The apparatus of claim 12, wherein one or more of the multiple values utilized to generate the data flow valuation result are obtained from the data flow valuation spanning operation performed remote from the given gateway node.

\* \* \* \* \*